United States Patent
Mizuno

(10) Patent No.: US 10,203,016 B2
(45) Date of Patent: Feb. 12, 2019

(54) SHOCK ABSORBER

(71) Applicant: TOYOTA JIDOSHA KABUSHIKI KAISHA, Toyota-shi, Aichi-ken (JP)

(72) Inventor: Kazuyuki Mizuno, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/700,745

(22) Filed: Sep. 11, 2017

(65) Prior Publication Data

US 2018/0128341 A1    May 10, 2018

(30) Foreign Application Priority Data

Nov. 9, 2016 (JP) ................. 2016-219010

(51) Int. Cl.
*F16F 9/512* (2006.01)
*F16F 9/19* (2006.01)
*F16F 9/348* (2006.01)

(52) U.S. Cl.
CPC .............. *F16F 9/5126* (2013.01); *F16F 9/19* (2013.01); *F16F 9/3484* (2013.01); *F16F 9/512* (2013.01); *F16F 2228/066* (2013.01); *F16F 2230/40* (2013.01)

(58) Field of Classification Search
CPC .......... F16F 9/5126; F16F 9/3484; F16F 9/19; F16F 2230/40; F16F 2228/066
See application file for complete search history.

(56) References Cited

U.S. PATENT DOCUMENTS

| | | | | |
|---|---|---|---|---|
| 5,261,448 A * | 11/1993 | Furuya | ................ | B60G 17/08 137/513.5 |
| 5,975,258 A * | 11/1999 | Nezu | ................ | F16F 9/348 188/266.5 |
| 9,500,251 B2 * | 11/2016 | Rummel | ................ | F16F 9/18 |
| 2006/0283676 A1 * | 12/2006 | Deferme | ................ | B60G 17/08 188/322.13 |
| 2009/0065315 A1 * | 3/2009 | Chikamatsu | ................ | F16F 9/5126 188/313 |
| 2015/0034434 A1 * | 2/2015 | Izeki | ................ | F16F 9/3484 188/280 |
| 2015/0198214 A1 | 7/2015 | Mizuno | | |

FOREIGN PATENT DOCUMENTS

| JP | 2015-132313 A | 7/2015 |
|---|---|---|
| JP | 2016-173140 A | 9/2016 |

* cited by examiner

*Primary Examiner* — Vishal R Sahni
(74) *Attorney, Agent, or Firm* — Oliff PLC

(57) ABSTRACT

A shock absorber is provided with a damping force generating valve for a very low-speed range that includes: a non-seated leaf valve having a stacked structure; and an opposed part that faces the free end of a largest leaf of the leaf valve and forms an orifice with the fee end. The largest leaf and one leaf, and the largest leaf and another leaf are arranged separately from each other in the axial direction of a piston by the respective spacers. The one leaf includes a leaf element having cutout parts on the side facing the largest leaf. The another leaf includes a leaf element having cutout parts on the side facing the largest leaf.

2 Claims, 6 Drawing Sheets

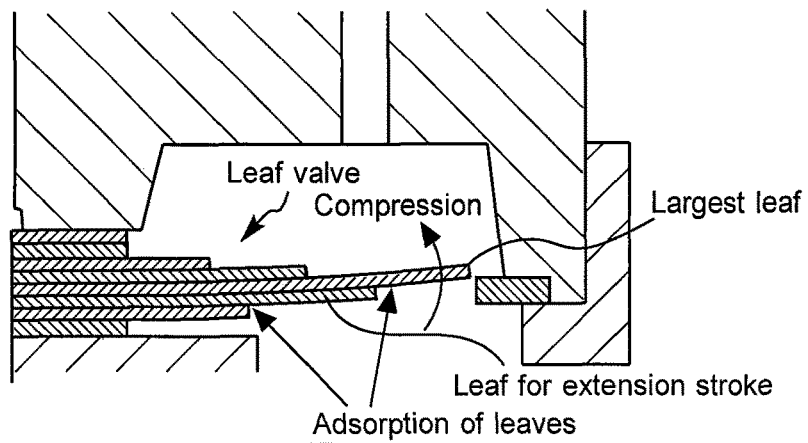
Fig. 3A
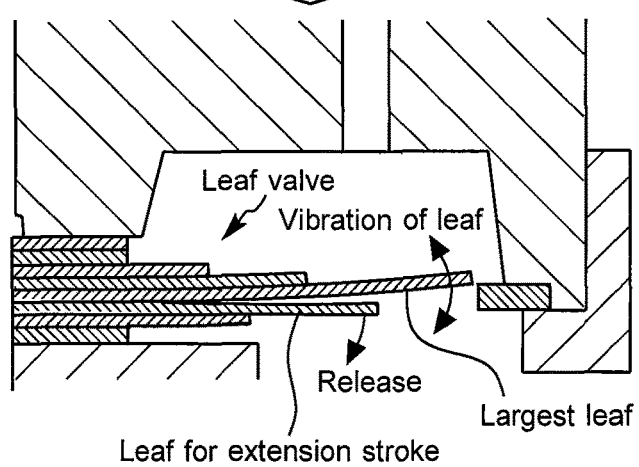
Fig. 3B
Fig. 4
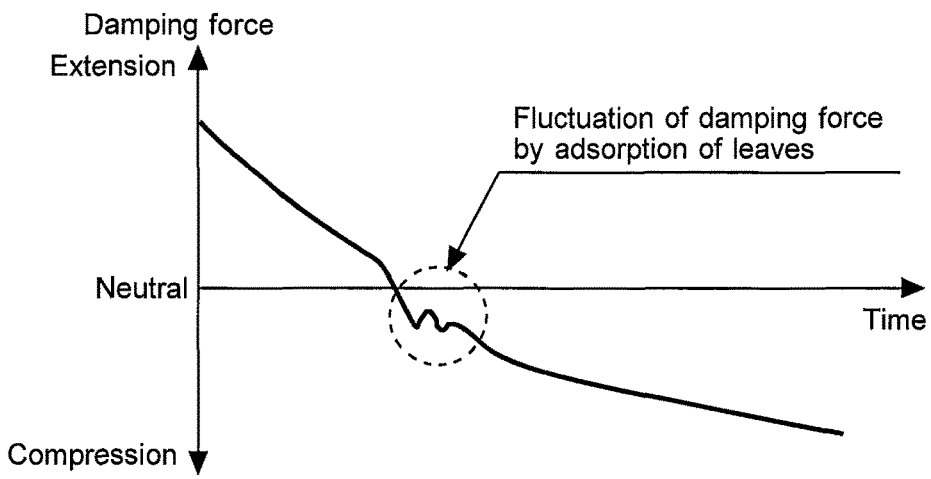

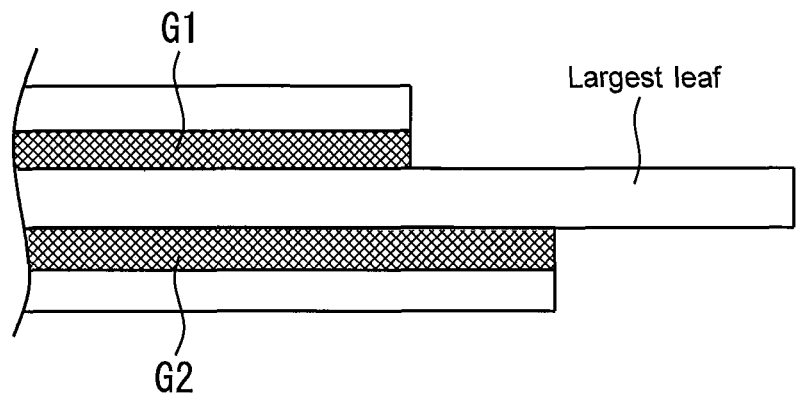
Fig. 5A
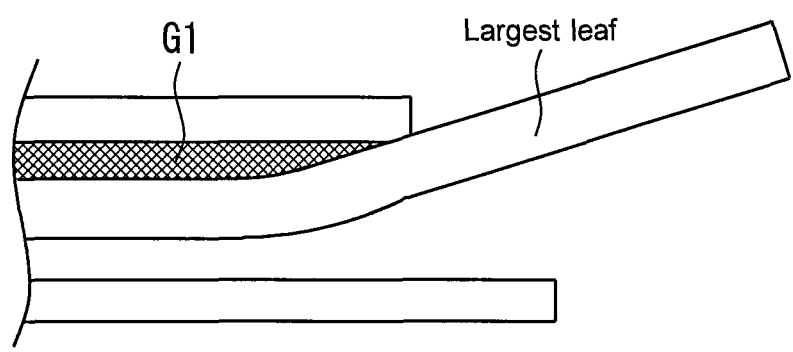
Fig. 5B
Fig. 6
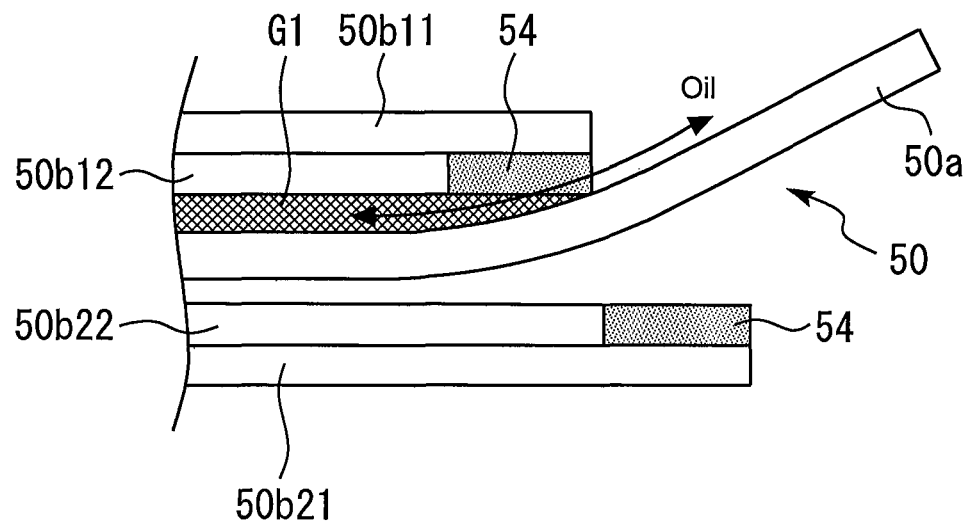

SHOCK ABSORBER

CROSS-REFERENCE TO RELATED APPLICATION

This application is based on and claims the benefit of Japanese Patent Application No. 2016-219010, filed on Nov. 9, 2016, which is incorporated by reference herein in its entirety.

BACKGROUND

Technical Field

The present disclosure relates to a shock absorber.

Background Art

For example, JP 2016-173140 A discloses a shock absorber that includes a leaf valve. In order to generate a proper damping force in a very low-speed range of a piston speed, this shock absorber is provided with a damping force generating valve for a very low-speed range. This damping force generating valve includes leaf valve elements and an opposed part. The leaf valve elements are cantilevered by a piston. The opposed part is opposed to free ends of the leaf valve elements. An orifice is formed between the leaf valve elements and the opposed part. In more detail, the damping force generating valve is a non-seated valve in which the leaf valve elements are not seated on the opposed part and is configured such that the leaf valve elements open in both directions in association with the extension and compression of the shock absorber. According to this kind of damping force generating valve of the non-seated type, a slap that is a problem on a damping force generating valve of a type in which leaf valve elements are seated on a valve seat part can be prevented from occurring when the leaf valve elements are seated.

In addition to JP 2016-173140 A, JP 2015-132313 A is a patent document which may be related to the present disclosure.

SUMMARY

It is conceivable that, in an oil type shock absorber that includes a non-seated leaf valve as disclosed in JP 2016-173140 A in order to generate an appropriate damping force at a low-speed range, the leaf valve is configured by stacking, in the axial direction of a piston, a plurality of leaves whose lengths in the radial direction of the piston are different from each other. If this kind of stacked structure is used for the leaf valve, the following problem may arise. That is, when each of the leaves of the leaf valve having a stacked structure is elastically deformed, adjacent two leaves may be adsorbed with each other via oil. If the adsorption of the adjacent two leaves is generated when the leaf valve is elastically deformed, there is a concern that fluctuation of the damping force of the shock absorber may be generated. This kind of fluctuation of the damping force may lead to an occurrence of abnormal noise.

The present disclosure has been made to address the problem described above, and an object of the present disclosure is to provide a shock absorber which includes a non-seated leaf valve having a stacked structure and in which adjacent two leaves can be prevented from being adsorbed with each other.

A shock absorber according to the present disclosure includes: a cylinder filled with oil; and a piston engaged with an inner wall of the cylinder in such a manner as to be reciprocatable in the cylinder, and forming a first cylinder chamber and a second cylinder chamber in the cylinder. The piston includes: a communication channel that connects the first cylinder chamber and the second cylinder chamber to each other; and a damping force generating valve configured to generate a damping force according to a piston speed of the piston in a low-speed range in which the piston speed is lower than or equal to a certain speed. The damping force generating valve includes a leaf valve and an opposed part. The leaf valve is formed by stacking, in an axial direction of the piston, a plurality of leaves whose lengths in a radial direction of the piston are different from each other. The plurality of leaves are cantilevered by the piston at one of its inner end part and its outer end part in the radial direction of the piston, and are elastically deformed depending on a differential pressure between the first cylinder chamber and the second cylinder chamber. The opposed part faces a free end of a largest leaf whose length in the radial direction is the largest of the plurality of leaves, and forms, with the free end, an orifice that is a part of the communication channel. The plurality of leaves include at least one set of adjacent two leaves. The adjacent two leaves are a first leaf and a second leaf whose length is longer than that of the first leaf. The first leaf and the second leaf that are adjacent to each other are arranged separately from each other in the axial direction via a gap forming member that is formed separately from the first leaf and the second leaf or integrally with either one of the first leaf and the second leaf. A part of an end portion on a side of a free end of the first leaf that comes into contact with the second leaf when the second leaf is elastically deformed is cut out.

A length in the radial direction of a leaf located away from the largest leaf by a predetermined distance on one side of the largest leaf in the axial direction may be different from a length in the radial direction of a leaf located away from the largest leaf by the predetermined distance on the other side of the largest leaf in the axial direction.

According to the shock absorber of the present disclosure, at least one set of adjacent two leaves which the leaf valve of the damping force generating valve include are arranged separately from each other in the axial direction of the piston via the gap forming member that is formed separately from the adjacent two leaves (that is, the first leaf and the second leaf) or integrally with either one of the adjacent two leaves. Also, a part of the end portion on the side of the free end of the first leaf, which is shorter in length than the second leaf, is cut out on the side facing the gap formed by the gas forming member. According to this kind of configuration, first, the adjacent two leaves can be prevented from being absorbed with each other when the leaf valve is elastically deformed because the adjacent two leaves are arranged separately from each other in the axial direction of the piston. Furthermore, the flow of the oil between the adjacent two leaves is made smooth because a part of the end portion on the side of the free end of the first leaf whose length in the radial direction is shorter of the adjacent two leaves is cut out. In this respect, the adjacent two leaves can also be prevented from being adsorbed with each other.

BRIEF DESCRIPTION OF THE DRAWINGS

FIGS. 3A and 3B are views for describing a problem on a non-seated leaf valve having a stacked structure;

FIG. 4 is a graph for illustrating an example of a change of the damping force of a damping force generating valve for a very low-speed range that includes the leaf valve shown in FIGS. 3A and 3B;

FIGS. 5A and 5B are views for describing a problem on the configuration of a comparison example that includes gaps G1 and G2 provided between adjacent leaves and does not include cutout parts;

FIG. 6 is a view for describing an advantageous effect, with respect to the configuration shown in FIGS. 5A and 5B, of the configuration according to the first embodiment that includes spacers and cutout parts;

DETAILED DESCRIPTION

In the following, embodiments of the present disclosure are described with reference to the accompanying drawings. However, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Further, structures or steps or the like that are described in conjunction with the following embodiments are not necessarily essential to the present disclosure unless explicitly shown otherwise, or unless the present disclosure is explicitly specified by the structures, steps or the like theoretically.

First Embodiment

Figure 1:
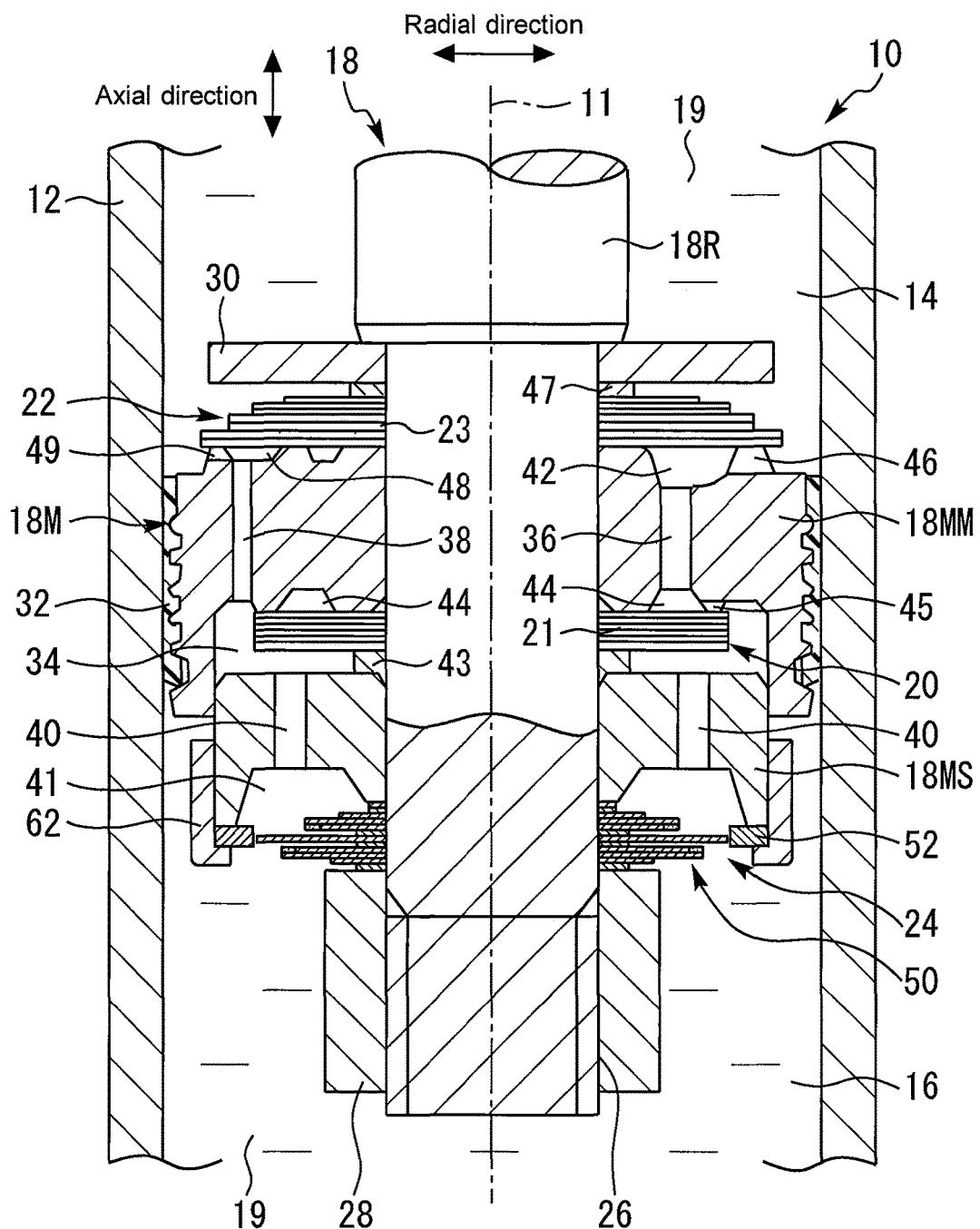
FIG. 1 is a cross-sectional view that shows a shock absorber according to a first embodiment of the present disclosure.
Figure 2:
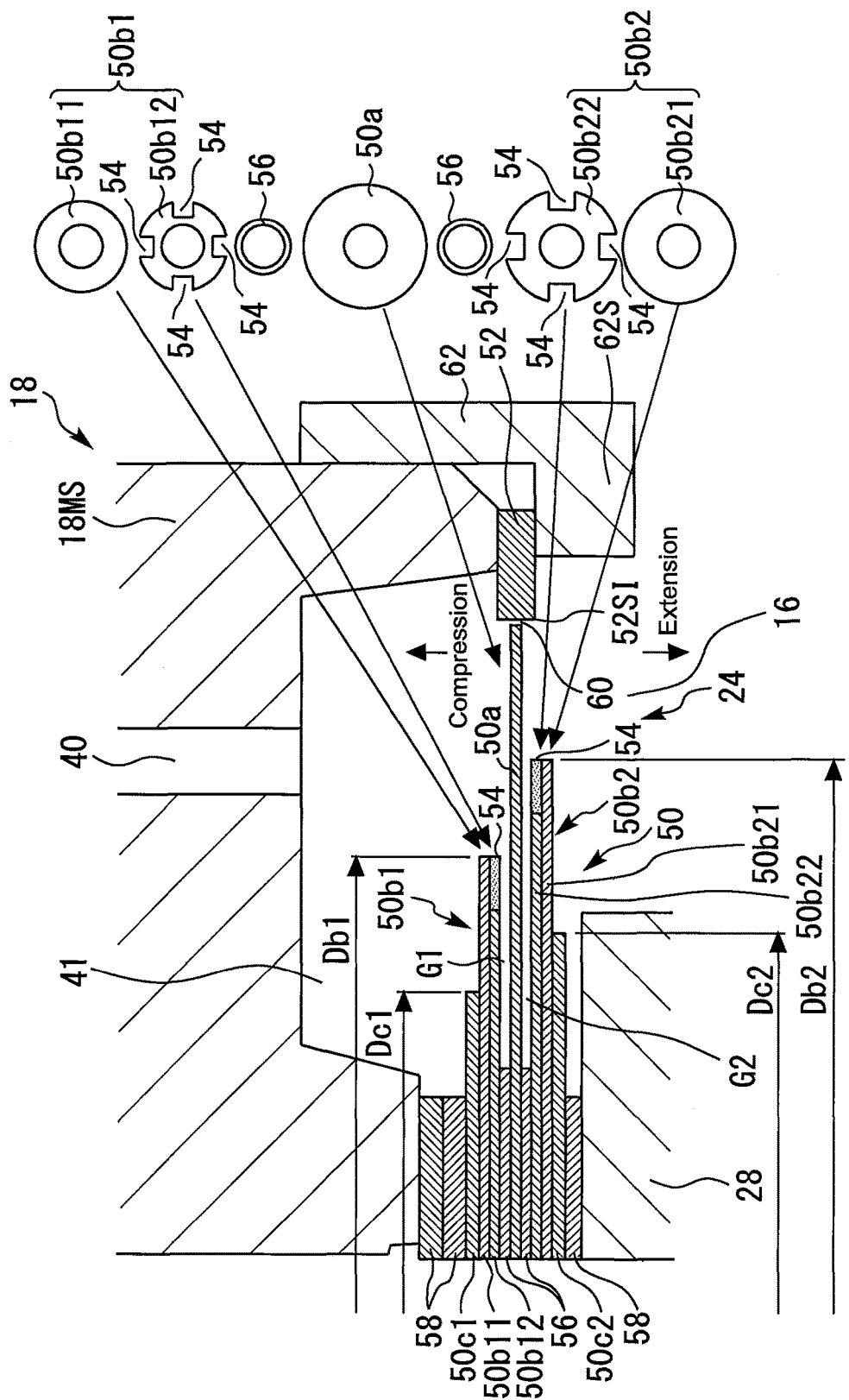
FIG. 2 is an enlarged cross-sectional view that illustrates a configuration around a damping force generating valve for a very low-speed range according to the first embodiment of the present disclosure.

FIGS. 1 and 2 are cross-sectional views that show a shock absorber 10 according to a first embodiment of the present disclosure. In more detail, FIG. 1 is a cross-sectional view that illustrates an overall configuration of a piston 18 that is arranged in a cylinder 12 of the shock absorber 10, and FIG. 2 is an enlarged cross-sectional view that illustrates a configuration around a damping force generating valve 24 for a very low-speed range which the piston 18 includes. As an example, the shock absorber 10 is applied to a vehicle.

[Configuration of Shock Absorber]

In FIGS. 1 and 2, the shock absorber 10 includes the cylinder 12 and the piston 18. The cylinder 12 extends along an axis line 11. The piston 18 is engaged with an inner wall of the cylinder 12 in such a manner as to be reciprocatable in the cylinder 12 along the axis line 11, and forms a cylinder upper chamber 14 and a cylinder lower chamber 16 in the cylinder 12. The cylinder upper chamber 14 and the cylinder lower chamber 16 is filled with an oil 19 that serves as a working liquid. The piston 18 includes a rod part 18R that extends along the axis line 11 and a piston body 18M that is attached to a lower end portion of the rod part 18R.

In addition, although not shown in FIGS. 1 and 2, the upper end and the lower end of the cylinder 12 are closed by end caps and the rod part 18R penetrates the end cap located at the upper end to extend outside the cylinder 12. The upper end of the rod part 18R is connected to the body of the vehicle, and the lower end of the cylinder 12 is connected to an unsprung member of the vehicle. Moreover, a free piston is arranged in the cylinder 12 between the piston body 18M and the end cap located at the lower end. A gas chamber is formed by the free piston as well as the end cap located at the lower end, and thereby, the gas chamber and the cylinder lower chamber 16 are separated by the free piston. The volume of the rod part 18R that is present in the cylinder 12 changes as a result of the extension and compression of the shock absorber 10, and the gas chamber absorbs the change of this volume.

As shown in FIG. 1, the piston body 18M is provided with a damping force generating valve 20 for an extension stroke, a damping force generating valve 22 for a compression stroke and the damping force generating valve 24 for the very low-speed range. These damping force generating valves 20, 22 and 24 are configured to generate the respective damping forces according to the piston speed of the piston 18. In more detail, the damping force generating valve 24 for the very low-speed range is configured to generate the damping force that is suitable when the piston speed falls within the very low-speed range. The piston body 18M includes a main body 18MM and a sub body 18MS. These damping force generating valves 20, 22 and 24, and the main body 18MM and the sub body 18MS are attached to the lower end portion of the rod part 18R by a nut 28 that is screwed together with an external thread 26 provided at the lower end of the rod part 18R with them being sandwiched between the nut 28 and a support ring 30.

In the present embodiment, a seal member 32 made of resin is attached along the outer circumference of the main body 18MM, and the seal member 32 is in contact with the inner wall of the cylinder 12 so as to be slidable. The sub body 18MS has an outer diameter smaller than the inner wall of the cylinder 12, and is press-fitted into a lower end portion of the main body 18MM. An intermediate chamber 34 is formed by the sub body 18MS as well as the main body 18MM. In the main body 18MM, a channel 36 for the extension stroke and a channel 38 for the compression stroke are formed. In the sub body 18MS, a plurality of channels 40 that are common for the extension stroke and the compression stroke are formed.

The channel 36 always communicates with a circular arc groove 42 and a circular ring groove 44 that are formed on the upper surface and the lower surface of the main body 18MM, respectively. The circular arc groove 42 and the circular ring groove 44 extend around the axis line 11. The circular arc groove 42 always communicates with the cylinder upper chamber 14 via a cutout 46 that is formed in a land part of the main body 18MM that is located on the outer side in the radial direction, without regarding whether or not the damping force generating valve 22 for the compression stroke is in a closed state. The circular ring groove 44 always communicates with the intermediate chamber 34 via a cutout 45 that is formed in a land part of the main body 18MM that is located on the outer side in the radial direction, even when the damping force generating valve 20 for the extension stroke is in a closed state.

The channel 38 always communicates with, at the upper end thereof, a circular arc groove 48 that is formed so as to extend around the axis line 11 in the upper surface of the main body 18MM, and always communicates with the intermediate chamber 34 at the lower end. The circular arc groove 48 always communicates with the cylinder upper chamber 14 via a cutout 49 that is formed at a land part of the main body 18MM that is located on the outer side in the radial direction, even when the damping force generating valve 22 for the compression stroke is in a closed state. The channels 40 always communicate with the intermediate chamber 34 at those upper ends and always communicates with a circular ring groove 41 at those lower ends. As will be described later in detail, the circular ring groove 41 always communicates with the cylinder lower chamber 16 via the damping force generating valve 24 for the very low-speed range. In addition, although only one channel 36 and one channel 38 are illustrated in FIG. 1, a plurality of channels 36 and a plurality of channels 38 may be provided in such a manner at to be separate from each other around the axis line 11.

The damping force generating valve 20 for the extension stroke is formed by stacking a plurality of leaves 21 that are formed in an annular disk shape and that can elastically deform, and is arranged in the intermediate chamber 34. The damping force generating valve 20 for the extension stroke is cantilevered in such a manner that the damping force generating valve 20 for the extension stroke as well as a spacer 43 is sandwiched between the main body 18MM and the sub body 18MS at an inner end part of the piston 18 on the inner side in the radial direction. The damping force generating valve 22 for the compression stroke is similarly formed by stacking a plurality of leaves 23 that are formed in an annular disk shape and that can elastically deform, and is arranged in the cylinder upper chamber 14. The damping force generating valve 22 for the compression stroke is cantilevered in such a manner that the damping force generating valve 22 for the compression stroke as well as a spacer 47 is sandwiched between the support ring 30 and the main body 18MM at the inner end part of the piston 18 on the inner side in the radial direction.

In addition, instead of the cutout 45, the cutouts may be provided at outer edge parts of the respective leaves 21 of the damping force generating valve 20 for the extension stroke, and the circular ring groove 44 and the intermediate chamber 34 may always communicate with each other via these cutouts. Similarly, instead of the cutout 49, a cutout may be provided at an outer edge part in the radial direction of the piston 18, of a largest leaf having the largest diameter in the leaves 23 of the damping force generating valve 22 for the compression stroke, and the circular arc groove 48 and the cylinder upper chamber 14 may always communicate with each other via the cutout.

(Configuration of Damping Force Generating Valve for Very Low-Speed Range)

As shown in FIGS. 1 and 2, the damping force generating valve 24 for the very low-speed range is a non-seated damping-force generating valve having a double swing structure as described below, and includes a leaf valve 50 and an opposed part 52.

The leaf valve 50 is formed by stacking, in the axial direction of the piston 18, a plurality of (as an example, five sheets of) leaves 50a, 50b1, 50b2, 50c1 and 50c2 whose lengths in the radial direction of the piston 18 are different from each other and that are formed in an annular disk shape. Also, these leaves 50a and the like are configured to be elastically deformed depending on the differential pressure between the cylinder upper chamber 14 and the cylinder lower chamber 16. In addition, the leaf 50a whose length in the radial direction of the piston 18 is the largest of these leaves 50a and the like is referred to as a "largest leaf 50a".

The leaf 50b1 that is one of the leaves adjacent to the largest leaf 50a is configured to serve as a sheet of leaf with a combination of leaf elements 50b11 and 50b12 that are independent of each other (that is, configured to elastically deform). As shown in FIG. 2, the leaf element 50b11 is formed is formed in an annular disk shape. The leaf element 50b12 is basically formed in an annular disk shape, and has a plurality of (as an example, four) cutout parts 54 that are formed at the outer edge parts of the leaf element 50b12 in the radial direction of the piston 18. To be more specific, the cutout parts 54 are formed in a predetermined shape (as an example, a quadrangular shape) at a predetermined interval (as an example, 90-degree intervals). Similarly to the leaf 50b1, the leaf 50b2 that is the other of the leaves adjacent to the largest leaf 50a is configured to serve as a sheet of leaf with a combination of leaf elements 50b21 and 50b22 that have a similar shape to the leaf elements 50b11 and 50b12.

One sheet of spacer 56, for example, is arranged between the largest leaf 50a and the leaf 50b1. With this kind of spacer 56 interposed between the largest leaf 50a and the leaf 50b1, the largest leaf 50a and the leaf 50b1 are arranged separately from each other by a gap G1 in the axial direction of the piston 18. Similarly, one sheet of spacer 56, for example, is also arranged between the largest leaf 50a and the leaf 50b2. Thus, the largest leaf 50a and the leaf 50b2 are also arranged separately from each other by a gap G2 in the axial direction.

The leaf 50c1 is arranged adjacent to the leaf 50b1 on the side opposite to the spacer 56. Also, the leaf 50c2 is arranged adjacent to the leaf 50b2 on the side opposite to the spacer 56. In addition, two sheets of spacers 58 are arranged adjacent to the leaf 50c1 on the side opposite to the leaf 50b1, and one sheet of spacer 58 is arranged adjacent to the leaf 50c2 on the side opposite to the leaf 50b2.

The leaves 50a, 50b1, 50b2, 50c1 and 50c2 of the leaf valve 50 are cantilevered by the piston 18 at the inner end part of the piston 18 in the radial direction. In more detail, these leaves 50a, 50b1, 50b2, 50c1 and 50c2 of the leaf valve 50 are cantilevered at the inner end part with these leaves 50a, 50b1, 50b2, 50c1 and 50c2 and spacers 56 and 58 sandwiched between the sub body 18MS and the nut 28.

Moreover, as shown in FIG. 2, the lengths of the five sheets of leaves in the radial direction of the piston 18 are greater in the order from the largest leaf 50a, the leaf 50b2, the leaf 50b1, the leaf 50c2 and the leaf 50c1. In this way, the leaf valve 50 has a structure that the thickness of the piston 18 in the axial direction becomes greater at a location closer to the fixed end (the inner end part) than at a location closer to the free end (the outer end part).

As will be described later in detail, during the extension stroke of the shock absorber 10, the leaf valve 50 bends to the lower side in FIG. 2. Therefore, the leaves 50b2 and 50c2 that are located on the side lower than the largest leaf 50a in FIG. 2 correspond to leaves that are used to determine damping force characteristics in the extension stroke. In contrast to this, during the compression stroke of the shock absorber 10, the leaf valve 50 bends to the upper side in FIG. 2. Therefore, the leaves 50b1 and 50c1 that are located on the side upper than the largest leaf 50a in FIG. 2 correspond to leaves that are used to determine damping force characteristics in the compression stroke.

The leaf 50b2 for the extension stroke and the leaf 50b1 for the compression stroke are equidistant from the largest leaf 50a in the thickness direction of leaves (that is, in the axial direction of the piston 18). In the present embodiment, with respect to the leaves 50b2 and 50b1 that have this kind of positional relationship, the dimensions of the leaves 50b2 and 50b1 are determined such that the diameter Db2 of the leaf 50b2 for the extension stroke becomes greater than the diameter Db1 of the leaf 50b1 for the compression stroke as shown in FIG. 2. This also applies to the leaf 50c2 for the extension stroke and the leaf 50c1 for the compression stroke that are equidistant from the largest leaf 50a. That is, the dimensions of the leaves 50c2 and 50c1 are determined such that the diameter Dc2 of the leaf 50c2 for the extension stroke becomes greater than the diameter Dc1 of the leaf 50c1 for the compression stroke.

Moreover, with respect to the leaf 50b1 that includes the leaf elements 50b11 and 50b12, the leaf element 50b12 having the cutout parts 54 is arranged so as to face the largest leaf 50a with the gap G1 that is formed by the spacer 56 interposed therebetween. According to this kind of arrangement, it can be said that an end portion on the side of the free end of a leaf (in this example, the leaf 50b1 which corresponds to a "first leaf" according to the present disclosure) whose length in the radial direction of the piston 18 is shorter among two leaves (in this example, the largest leaf 50a, which corresponds to a "second leaf" according to the present disclosure, and the leaf 50b1) that are adjacent to each other is cut out on the side facing the gap G1 formed by the spacer 56. Although the leaf 50b1 for the compression stroke is herein described as an example, this also applies to the leaf 50b2 for the extension stroke.

The opposed part 52 is arranged so as to face the free end of the largest leaf 50a outside the leaf valve 50 in the radial direction, and forms an orifice 60 with the free end. The circular ring groove 41 always communicates with the cylinder lower chamber 16 with this orifice 60 interposed therebetween. The opposed part 52 is formed in an annular disk shape using a substantially rigid material. The outer circumference of a lower end portion of the sub body 18MS is fixed to a support member 62 using, for example, press fitting. The lower end of the support member 62 is formed as a support part 62S of an annular disk shape. The opposed part 52 is supported by being sandwiched between the sub body 18MS and the support part 62S.

(Communication Channel Connecting First and Second Cylinder Chambers)

As will be understood by the above description, the cutout 46, the circular arc groove 42, the channel 36, the circular ring groove 44, the cutout 45, the intermediate chamber 34, the channels 40 and the circular ring groove 41 correspond to the "communication channel" for the extension stroke that connects the cylinder upper chamber 14 (which corresponds to the "first cylinder chamber" according to the present disclosure) with the cylinder lower chamber 16 (which corresponds to the "second cylinder chamber" according to the present disclosure). The circular ring groove 41, the channels 40, the intermediate chamber 34, the channel 38, the circular arc groove 48 and the cutout 49 correspond to the "communication channel" for the compression stroke that connects the cylinder upper chamber 14 with the cylinder lower chamber 16. The orifice 60 is a part of the "communication channel" for the extension stroke and a part of the "communication channel" for the compression stroke.

[Basic Operation and Damping Force Characteristics of Shock Absorber]

During the extension stroke of the shock absorber 10, the pressure in the cylinder upper chamber 14 is higher than the pressure in the cylinder lower chamber 16. Thus, the oil 19 in the cylinder upper chamber 14 is caused to flow into the cylinder lower chamber 16 via the aforementioned communication channel for the extension stroke. As a result of this, the leaf valve 50 of the damping force generating valve 24 for the very low-speed range is elastically deformed and bends to the lower side in FIG. 2. In contrast to this, during the compression stroke of the shock absorber 10, the pressure in the cylinder lower chamber 16 is higher than the pressure in the cylinder upper chamber 14. Thus, the oil 19 in the cylinder lower chamber 16 is caused to flow into the cylinder upper chamber 14 via the aforementioned communication channel for the compression stroke. As a result of this, the leaf valve 50 is elastically deformed and bends to the upper side in FIG. 2.

If the piston speed increases at the time of extension and compression of the shock absorber 10, the differential pressure between the cylinder upper chamber 14 and the cylinder lower chamber 16 becomes greater. The damping force generating valve 24 for the very low-speed range is configured to open at a piston speed that is lower than a piston speed at which the damping force generating valves 20 and 22 open (in other words, to open at a differential pressure that is smaller than a differential pressure at which the damping force generating valves 20 and 22 open). This kind of configuration can be achieved with an adjustment of parameters that affect the valve stiffness, such as the material and the thickness of the valve.

The amount of elastic deformation of the damping force generating valve 24 for the very low-speed range becomes greater as the piston speed is higher (that is, as the differential pressure is greater). A symbol "D" denotes a minimum distance between the outer edge part (that is, the free end) of the largest leaf 50a and an inner circumferential surface 52SI of the opposed part 52 when the largest leaf 50a is not elastically deformed. Also, a predetermined elastic deformation range R denotes a range in which the upper end of the outer edge part of the largest leaf 50a which is closest to the opposed part 52 lies at the same level as or higher than the lower end of the inner circumferential surface 52SI of the opposed part 52 and in which the lower end of the outer edge part of the largest leaf 50a lies at the same level as or lower than the upper end of the inner circumferential surface 52SI.

If the amount of elastic deformation of the damping force generating valve 24 for the very low-speed range reaches a value within the elastic deformation range R, the minimum distance D is substantially constant regardless of the amount of the elastic deformation. Thus, if the amount of elastic deformation of the damping force generating valve 24 for the very low-speed range reaches a value within the elastic deformation range R, an effective channel cross-sectional area of the orifice 60 is substantially constant regardless of the amount of the elastic deformation of the damping force generating valve 24 for the very low-speed range. The effective channel cross-sectional area of the orifice 60 is smaller than the effective channel cross-sectional area of the cutout 45 at the time of the damping force generating valve 20 for the extension stroke being closed, and is smaller than the effective channel cross-sectional area of the cutout 49 at the time of the damping force generating valve 22 for the compression stroke being closed.

The upper limit value of the piston speeds in which the amount of elastic deformation of the damping force generating valve 24 for the very low-speed range falls within the elastic deformation range R during the extension stroke of the shock absorber 10 is referred to as a "certain speed Ve". This certain speed Ve is a very low speed at which the piston speed is closer to zero. According to the damping force generating valves 20, 22 and 24 having the configuration described above, in a very low-speed range at which the piston speed is equal to or lower than the certain speed Ve, the amount of elastic deformation of the damping force generating valve 24 for the very low-speed range falls within the elastic deformation range R and the damping force generating valve 20 for the extension stroke is closed. More specifically, in this very low-speed range, the damping force generating valve 24 for the very low-speed range generates a damping force according to the piston speed, and therefore, the damping force is adjusted using the operation of the damping force generating valve 24 for the very low-speed range. Furthermore, in this very low-speed range, the oil 19 passes through the orifice 60 whose effective channel cross-sectional area is very small, and therefore, the damping force rapidly increases as a result of an increase of the piston speed.

On the other hand, in a speed range (that is, an orifice range) on the lower speed side in which the damping force generating valve 20 for the extension stoke is still closed, of a high speed range at which the piston speed is higher than the certain speed Ve, the flow rate of the oil 19 that passes through the cutout 45 becomes greater accompanying an increase of the piston speed. As a result of this, accompanying an increase of the piston speed, the damping force becomes greater with an increase rate that is lower than that at the very low-speed range described above. Moreover, if the piston speed further increases in the high speed range and then the damping force generating valve 20 for the extension stroke opens (that is, a valve range), the oil 19 is caused to pass through the damping force generating valve 20 for the extension stroke that is open. As a result, as the piston speed increases, the damping force becomes greater with an increase rate that is lower than that before the damping force generating valve 20 for the extension stroke opens.

As shown in FIG. 2, the diameters of leaves 50$a$, 50$b1$, 50$b2$, 50$c1$ and 50$c2$ of the leaf valve 50 are asymmetric with respect to the largest leaf 50$a$. In more detail, the diameters Db2 and Dc2 of the leaves 50$b2$ and 50$c2$ for the extension stroke are greater than the diameters Db1 and Dc1 of the leaves 50$b1$ and 50$c1$ for the compression stroke, respectively. Therefore, according to the leaf valve 50, the bending stiffness is lower in the compression stroke than in the extension stroke. Due to this point, the upper limit value of the piston speeds in which the amount of elastic deformation of the damping force generating valve 24 for the very low-speed range falls within the elastic deformation range R during the compression stroke (which is referred to as a "certain speed Vc") is different from the certain speed Ve for the extension stroke. In more detail, the certain speed Vc is lower than the certain speed Ve. Although there is this kind of difference, the operation of the damping force generating valves 22 and 24 in the compression stroke is similar to the operation of the damping force generating valves 20 and 24 in the extension stroke. Thus, the detailed description thereof is herein omitted. This certain speed Vc is also a very low speed at which the piton speed is closer to zero, as in the certain speed Ve.

[Problem on Applying Non-Seated Leaf Valve Having Stacked Structure and Technical Effect Achieved by Configuration According To First Embodiment as Countermeasure Against this Problem]

FIGS. 3A and 3B are views for describing a problem on a non-seated leaf valve having a stacked structure. The configuration shown in FIGS. 3A and 3B is referred to for comparison with the configuration according to the present embodiment shown in FIG. 2, and corresponds to a leaf valve of a damping force generating valve for a very low-speed range that does not include the spacers 56 and the cutout parts 54.

FIG. 3A shows how the leaf valve is elastically deformed during the compression stroke of the shock absorber. In the leaf valve in which a plurality of leaves are simply stacked in close contact with each other without a special configuration that the present embodiment includes, adjacent two leaves may be adsorbed with each other via oil when each of the leaves is elastically deformed. In the example shown in FIG. 3A, the largest leaf and the leaves for the extension stroke that are adjacent to the largest leaf are adsorbed with each other via the oil. In addition, this kind of adsorption of the leaves is likely to be generated when a vibration of a so-called unsprung vibration frequency (about 15 Hz) is inputted to the shock absorber.

FIG. 3B shows how the leaf valve behaves when the adsorption is released (that is, when the leaves for the extension stroke that have been adsorbed are released from each other) after the elastic deformation of the leaf valve becomes greater with the adjacent two leaves being adsorbed with each other. In this way, if the leaf that has been once adsorbed is released from the largest leaf during the elastic deformation of the leaf valve, the largest leaf vibrates as shown in FIG. 3B.

FIG. 4 is a graph for illustrating an example of a change of the damping force of the damping force generating valve for a very low-speed range that includes the leaf valve shown in FIGS. 3A and 3B. To be more specific, FIG. 4 shows a change of the damping force during the course of transitioning from the extension stroke to the compression stroke in the shock absorber. If the adsorption of the leaf valve as shown in FIG. 3A is generated and the largest leaf vibrates thereafter as a result of the leaf that has been adsorbed as shown in FIG. 3B being released from the largest leaf, a large change of the damping force may be generated as shown in FIG. 4. This kind of fluctuation of the damping force may lead to an occurrence of abnormal noise. In addition, a similar problem may also arise during the course of transitioning from the compression stroke to the extension stroke.

The damping force generating valve 24 for the very low-speed range according to the present embodiment includes the spacer 56 arranged between the largest leaf 50$a$ and the leaf 50$b1$ and the spacer 56 arranged between the largest leaf 50$a$ and the leaf 50$b2$. With the spacers 56 that are arranged like this, as shown in FIG. 2, the gap G1 or gap G2 can be provided between the largest leaf 50$a$ and each of the leaves 50$b1$ and 50$b2$. This can prevent the adjacent leaves from closely contacting with each other. Consequently, with the configuration according to the present embodiment, even when the leaf valve is elastically deformed in the compression stroke as in the example shown in FIG. 3A, the largest leaf 50$a$ and the leaf 50$b2$ on the side of the opposite stroke (in this example, the extension stroke) can be prevented from being absorbed with each other. This technical effect can also be achieved when the leaf valve is elastically deformed in the extension stroke in contrast to the example shown in FIG. 3A.

Next, FIGS. 5A and 5B are views for describing a problem on the configuration of a comparison example that includes the gaps G1 and G2 provided between adjacent leaves and does not include the cutout parts 54. FIG. 5A is an enlarged view for a main part of a leaf valve when it is not elastically deformed, and FIG. 5B is an enlarged view for the enlarged main part of the leaf valve when it is elastically deformed in the compression stroke as an example. As can be understood by comparing FIG. 5A with FIG. 5B, if the largest leaf is elastically deformed in the compression stroke, the gap G1 between the largest leaf and the leaf for the compression stroke that is adjacent to the largest leaf becomes smaller. In order to recover the volume of the gap G1 when the largest leaf returns to a posture shown in FIG. 5A thereafter, it is required to suck the oil into the gap G1. However, since this configuration does not includes the cutout parts 54, the gap G1 shown in FIG. 5B is closed by the largest leaf during elastically deforming and the leaf for the compression stroke. Thus, in this configuration, since the oil is hard to be supplied into the gap G1 when the largest leaf returns to the posture shown in FIG. 5A, adsorption is likely to be generated between the largest leaf and the leaf for the compression stroke. As a result of this, the maxim leaf becomes hard to return to the posture shown in FIG. 5A and a smooth operation of the largest leaf ceases to function.

FIG. 6 is a view for describing an advantageous effect, with respect to the configuration shown in FIGS. 5A and 5B, of the configuration according to the first embodiment that includes the spacers 56 and the cutout parts 54. To be more specific, FIG. 6 shows a state in which, as a result of the largest leaf 50a being elastically deformed in the compression stroke, the surface of the largest leaf 50a and the corner of the outer edge part of the leaf 50b1 for the compression stroke are in contact with each other. As shown in FIG. 6, at the outer edge part of the leaf 50b1, the cutout parts 54 are provided on the side of the largest leaf 50a. Thus, with the configuration according to the present embodiment, the cutout parts 54 can be used as oil channels between the largest leaf 50a and the leaf 50b1. This makes it possible to easily supply the oil into the gap G1 via the cutout parts 54 when the largest leaf 50a returns to a non-elastic-deformation state. As a result, since the flow of the oil between the leaves is made smooth, an occurrence of the adsorption in the manner described with reference to FIG. 5B can be reduced. Moreover, according to the present configuration, the oil becomes easy to be secured in the gap G1 when the largest leaf 50a is caused to elastically deform for the opposite stroke (in this example, the extension stroke) immediately after the largest leaf 50a returns to the non-elastic-deformation state. Thus, an occurrence of the adsorption in the manner described with reference to FIG. 3A can also be reduced between the largest leaf 50a and the leaf 50b1 that corresponds to a leaf for the opposite stroke in this example. In addition, the technical effect described with reference to FIG. 6 can also be achieved similarly in the relationship between the largest leaf 50a and the leaf 50b2 when the leaf valve 50 is elastically deformed in the extension stroke, contrary to the above example.

In further addition to the above, with the configuration according to the present embodiment that includes the spacers 56 and the cutout parts 54, the oil can be easy to be drained out of the gap G1 (see FIG. 2) or G2 (see FIG. 2) using the cutout parts 54 when the gap G1 or G2 decreases as a result of the largest leaf 50a being elastically deformed. Including this point, according to the present configuration, the largest leaf 50a can be operated more smoothly when the largest leaf 50a is elastically deformed.

As described so far, with the configuration according to the present embodiment that includes the spacers 56 and the cutout parts 54, the adsorption of the leaves can be prevented between the adjacent leaves, and the leaf valve 50 can be operated more smoothly. As a result of this, the dynamic characteristics of the damping force of the shock absorber 10 can be made better.

[Problem on Stress Concentration and Technical Effect by Configuration According To First Embodiment as Countermeasure Against this Problem]

The leaf valve 50 according to the present embodiment is of a non-seated type and has a double swing structure. Also, the leaf valve 50 is applied to the damping force generating valve 24 for the very low-speed range. In order to generate an appropriate damping force in the very low-speed range, it is required to lower the stiffness of the leaf valve and use the leaf valve soft. Accordingly, if the stress concentrates on a certain location of the leaf valve without a special consideration, there is a concern that the durability of the leaf valve may decrease.

In view of the problem on the stress concentration as described above, in the leaf valve 50 according to the present embodiment, the following consideration is made with respect to the configuration of the leaves 50a, 50b1, 50b2, 50c1 and 50c2 as already described. That is, the diameter Db2 of the leaf 50b2 for the extension stroke that is equidistant from the largest leaf 50a is determined to be different from the diameter Db1 of the leaf 50b1 for the compression stroke. Also, similarly with respect to the leaf 50c2 for the extension stroke and the leaf 50c1 for the compression stroke that are equidistant from the largest leaf 50a, the diameter Dc2 of the leaf 50c2 for the extension stroke is determined to be different from the diameter Dc1 of the leaf 50c1 for the compression stroke.

Figure 7A:
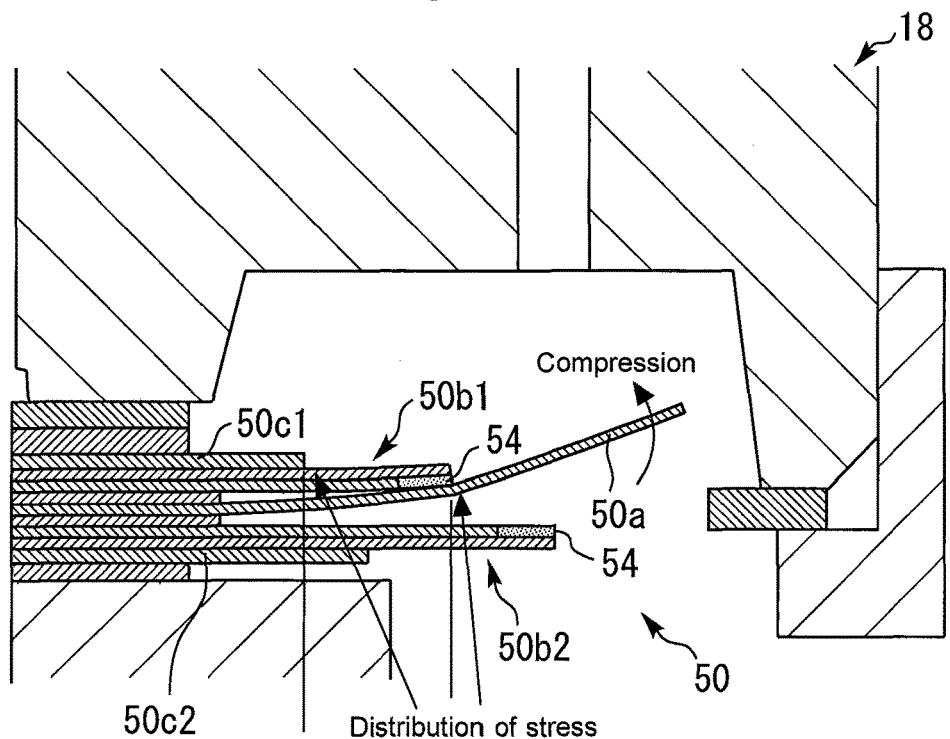
FIGS. 7A and 7B are views for describing a technical effect of the setting of the diameters of leaves of a leaf valve shown in FIG. 2.
Figure 7B:
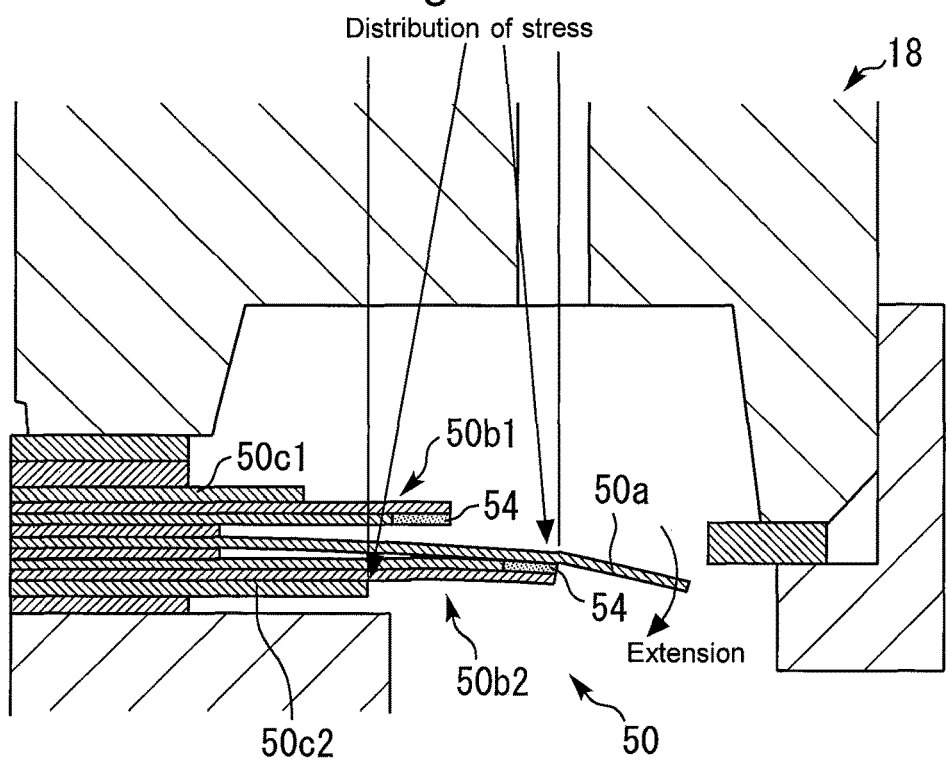

FIGS. 7A and 7B are views for describing a technical effect of the setting of the diameters of the leaves 50a, 50b1, 50b2, 50c1 and 50c2 of the leaf valve 50 shown in FIG. 2. FIG. 7A shows how the leaf valve 50 operates during the compression stroke, and FIG. 7B shows how the leaf valve 50 operates during the extension stroke.

The stress is likely to act on a largest leaf at locations near the distal ends (the outer edge parts) of other leaves that come into contact with the largest leaf directly or indirectly via another leaf at the time of the elastic deformation. With the configuration of the leaf valve 50 according to the present embodiment that is configured such that the valve diameters are different between the leaves 50b2 and 50c2 for the extension stroke and the leaves 50b1 and 50c1 for the compression stroke, the location at which the stress is likely to act on the largest leaf 50a during the extension stroke can be caused to differ from that during the compression stroke as shown in FIGS. 7A and 7B. That is, according to the present configuration, the stress that acts on the largest leaf 50a can be distributed properly. The durability of the leaf valve 50 can therefore be improved.

In further addition to the above, with the shock absorber 10 that includes the damping force generating valve 24 for the very low-speed range having the leaf valve 50 according to the present embodiment, the improvement of the dynamic characteristics of the damping force and the distribution of the stress can both be achieved.

Figure 8:
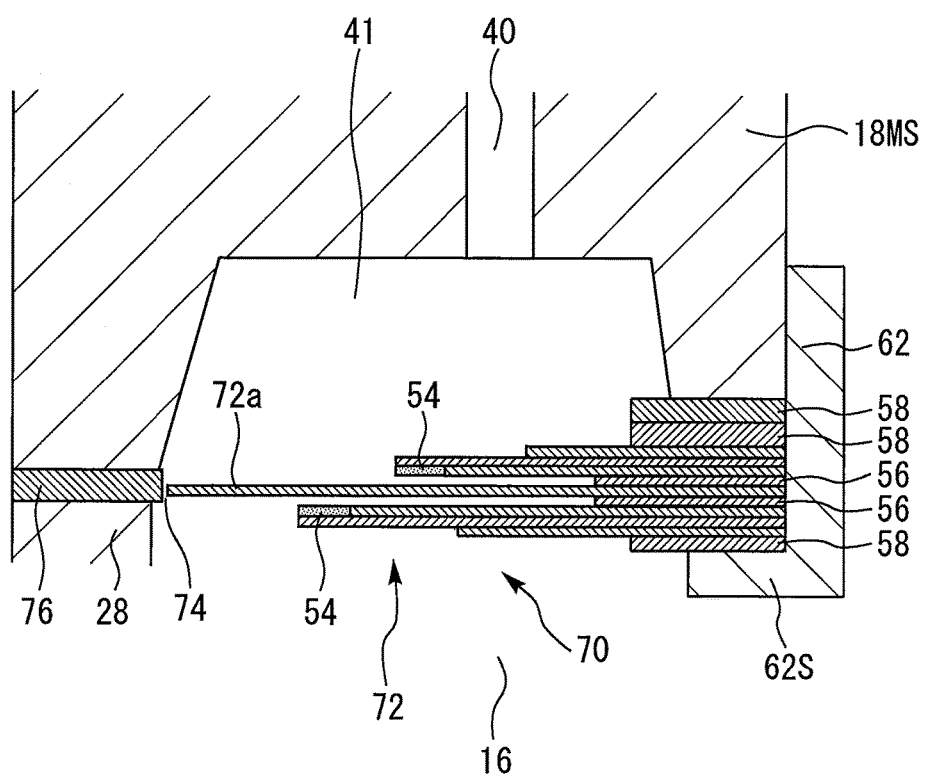
FIG. 8 is a view that illustrates another example of the supporting method of the leaf valve of the shock absorber according to the present disclosure.

In addition, the piston 18 of the shock absorber 10 according to the first embodiment described above includes the damping force generating valve 24 for the very low-speed range that has a structure in which the plurality of leaves 50a, 50b1, 50b2, 50c1 and 50c2 are cantilevered by the piston 18 at its outer end part in the radial direction of the piston 18. FIG. 8 is a view that illustrates another example of the supporting method of the leaf valve of the shock absorber according to the present disclosure. The piston of the shock absorber according to the present disclosure may include a damping force generating valve 70 for the very low-speed ranged that has a structure as shown in FIG. 8. Note that, in FIG. 8, elements that are the same as constituent elements illustrated in FIG. 2 mentioned above are denoted by the same reference symbols, and a description of those elements is omitted or simplified hereunder.

Specifically, in the damping force generating valve 70 shown in FIG. 8, each of leaves of a leaf valve 72 is cantilevered in such a manner that each of the leaves as well as spacers 56 and 58 is sandwiched between the sub body 18MS and the support part 62S at an outer end part of the piston in the radial direction of the piston. Also, an opposed part 76 that is opposed to a free end of a largest leaf 72a of the leaf valve 72 and that forms, with the free end, an orifice 74 that is a part of the communication channel is supported in such a manner as to be sandwiched between the sub body 18MS and the nut 28. In this way, the damping force generating valve that the piston of the shock absorber according to the present disclosure includes may include a leaf valve in which a plurality of leaves are cantilevered by the piston at its outer end part in the radial direction of the piston.

Also, in the first embodiment described above, as an example, the spacers 56 are provided as the "gap forming member" according to the present disclosure. However, the "gap forming member" according to the present disclosure is not limited to one that is formed separately from adjacent two leaves as in the spacers 56, and may be formed integrally with one leaf of the adjacent two leaves.

Moreover, in the first embodiment described above, as an example, the outer diameter of the leaf element 50$b$12 having the cutout parts 54 is the same as that of the leaf element 50$b$11 as shown in FIG. 2. However, the outer diameter of the leaf element 50$b$12 may not be necessarily the same as that of the leaf element 50$b$11. On the other hand, if the outer diameter of the leaf element 50$b$12 is too smaller than that of the leaf element 50$b$11, not the leaf element 50$b$12 having the cutout parts 54 but the other leaf element 50$b$11 comes in contact with the largest leaf 50$a$ when the largest leaf 50$a$ is elastically deformed. If this kind of configuration is adopted, the cutout parts 54 cannot be used as oil channels. It is therefore required that the relationship between the outer diameter of the leaf element 50$b$12 having the cutout parts 54 and the outer diameter of the other leaf element 50$b$11 is set while satisfying requirements that the edges of the cutout parts 54 come into contact with the largest leaf 50$a$ when the largest leaf 50$a$ is elastically deformed. This also applies to the relationship between the leaf element 50$b$21 and the leaf element 50$b$22.

Moreover, in the leaf valve 50 according to the first embodiment described above, in view of the problem on the stress concentration described above, the diameters of the leaves 50$b$2 and 50$c$2 for the extension stroke that are equidistant from the largest leaf 50$a$ are determined in such a manner as to be different from the diameters of the leaves 50$b$1 and 50$c$1 for the compression stroke. However, the leaf valve of the "damping force generating valve" that is the object of the present disclosure is not limited to one that is configured such that the leaves located on the extension stroke side and the leaves located on the compression stroke side are asymmetric with respect to the largest leaf as in the configuration described above, as far as the leaf valve includes a gap forming member and a cutout part. That is, the leaves located on the extension stroke side and the leaves located on the compression stroke side may be symmetric with respect to the largest leaf.

Moreover, the leaf valve 50 according to the first embodiment described above includes the leaves 50$b$1 and 50$b$2 that are configured by the leaf elements 50$b$11 and 50$b$21 without the cutout parts 54 and the leaf elements 50$b$12 and 50$b$22 with the cutout parts 54. The leaf valve that is the object of the present disclosure is not limited to one that is configured described above, as far as the leaf valve is configured such that "a part of an end portion on a side of a free end of the first leaf that comes into contact with the second leaf when the second leaf is elastically deformed is cut out". That is, the leaf element 50$b$11 and the leaf element 50$b$12 that are described above may be formed integrally with each other, for example.

Moreover, in the first embodiment described above, the spacer 56 corresponding to the gas forming member is interposed between the largest leaf 50$a$ and the leaf 50$b$1, and are also interposed between the largest leaf 50$a$ and the leaf 50$b$2. Also, the cutout parts 54 are provided for each of the leaves 50$b$1 and 50$b$2. However, the example of the portions at which the gap forming member and the cutout structure according to the present disclosure are provided is not limited to the above. In other words, the example of the gap forming member and the cutout structure is not limited to the above, as far as they are provided for at least one set of adjacent two leaves. Therefore, in the damping force generating valve 24 for the very low-speed range shown in FIG. 2, the gap forming member and the cutout structure may be provided additionally, as needed, between the leaf 50$b$1 and the leaf 50$c$1 and also between the leaf 50$b$2 and the leaf 50$c$2, for example.

Moreover, in the first embodiment described above, as an example, the leaf valve 50 having five sheets of leaves 50$a$, 50$b$1, 50$b$2, 50$c$1 and 50$c$2 are provided. However, the number of leaves that the leaf valve of the "damping force generating valve" according to the present disclosure is not limited to five, as far as at least two leaves are provided.

Furthermore, in the first embodiment described above, although the shock absorber 10 is a single-tube shock absorber, the present disclosure may be applied to a multi-tube shock absorber.

What is claimed is:
1. A shock absorber, comprising:
a cylinder filled with oil; and
a piston engaged with an inner wall of the cylinder in such a manner as to be reciprocatable in the cylinder, and forming a first cylinder chamber and a second cylinder chamber in the cylinder,
wherein the piston includes:
a communication channel that connects the first cylinder chamber and the second cylinder chamber to each other; and
a damping force generating valve configured to generate a damping force according to a piston speed of the piston in a low-speed range in which the piston speed is lower than or equal to a certain speed,
wherein the damping force generating valve includes a leaf valve and an opposed part,
wherein the leaf valve is formed by stacking, in an axial direction of the piston, a plurality of leaves whose lengths in a radial direction of the piston are different from each other,
wherein the plurality of leaves are cantilevered by the piston at one of its inner end part and its outer end part in the radial direction of the piston, and are elastically deformed depending on a differential pressure between the first cylinder chamber and the second cylinder chamber,
wherein the opposed part faces a free end of a largest leaf whose length in the radial direction is the largest of the plurality of leaves, and forms, with the free end, an orifice that is a part of the communication channel,
wherein the plurality of leaves include at least one set of adjacent two leaves,
wherein the adjacent two leaves are a first leaf and a second leaf whose length is longer than that of the first leaf,
wherein the first leaf and the second leaf that are adjacent to each other are arranged separately from each other in the axial direction via a gap forming member that is formed separately from the first leaf and the second leaf or integrally with either one of the first leaf and the second leaf, and wherein a part of an end portion on a side of a free end of the first leaf that comes into contact with the second leaf when the second leaf is elastically deformed is cut out.

2. The shock absorber according to claim 1, wherein a length in the radial direction of a leaf located away from the largest leaf by a predetermined distance on one side of the largest leaf in the axial direction is different from a length in the radial direction of a leaf located away from the largest leaf by the predetermined distance on the other side of the largest leaf in the axial direction.

* * * * *